United States Patent [19]
Kim et al.

[11] Patent Number: 5,882,238
[45] Date of Patent: Mar. 16, 1999

[54] METHOD FOR MANUFACTURING BEND-ALIGNED LIQUID CRYSTAL CELL USING LIGHT

[75] Inventors: Jong Hyun Kim; Ki Hyuk Yoon; Joung Won Woo, all of Seoul; Mi Sook Nam; Yoo Jin Choi, both of Kyngki-Do, all of Rep. of Korea

[73] Assignee: LG Electronics Inc., Seoul, Rep. of Korea

[21] Appl. No.: 628,770

[22] Filed: Sep. 24, 1996

[30] Foreign Application Priority Data

Dec. 8, 1995 [KR] Rep. of Korea .................. 1995 47760

[51] Int. Cl.⁶ .................................................. G02F 1/1337
[52] U.S. Cl. ............................................. 445/24; 349/135
[58] Field of Search ................................ 445/24; 349/135

[56] References Cited

FOREIGN PATENT DOCUMENTS 0 667 554 A1  8/1995  European Pat. Off. .
2 281 977  3/1995  United Kingdom .

OTHER PUBLICATIONS

Hashimoto et al., "TN–LCD with Quartered Subpixels Using Polarized UV–Light–Irradiated Polymer Orientation Films", SID 95 Digest, pp. 877–880, (1995).

M. Schadt et al., "Surface–Induced Parallel Alignment of Liquid Crystals by Linearly Polymerized Photopolymers", Jpn. J. Appl. Phys., 31(7):2155–2164 (1992).

*Primary Examiner*—Kenneth J. Ramsey
*Attorney, Agent, or Firm*—Finnegan, Henderson, Farabow, Garrett & Dunner, L.L.P.

[57] ABSTRACT

A bend-aligned liquid crystal cell is manufactured by irradiating first and second alignment layers with first and second polarized ultraviolet lights to impart first and second pretilt angles in the first and second alignment layers, and injecting molecules of liquid crystal material between the first and second alignment layers. The alignment layers include polysiloxane based materials or polyvinylfluorocinnamate in which the pretilt angle of the alignment layer is changeable according to the ultraviolet absorption energy.

10 Claims, 6 Drawing Sheets

METHOD FOR MANUFACTURING BEND-ALIGNED LIQUID CRYSTAL CELL USING LIGHT

BACKGROUND OF THE INVENTION

The present invention relates to a method for manufacturing liquid crystal cell, and more particularly to a method for manufacturing bend-aligned liquid crystal cell using light, which is easier to manufacture than a conventional method using rubbing, and to a method for manufacturing bend-aligned liquid crystal cell with improved viewing angle.

A conventional liquid crystal display is mainly a twisted nematic liquid crystal display(referred as TNLCD) which has a character of changing a transmittance at each gray level according to the viewing angle. FIG. 1a is a graph showing a relationship between the transmittance and a voltage applied to said twisted nematic liquid crystal cell, FIG. 1b is a graph showing a relationship between the transmittance and a viewing angle at horizontal direction, and FIG. 1c is a graph showing a relationship between the transmittance and a viewing angle at vertical direction. Referring to FIG. 1a to 1c, while the transmittance is symmetrically distributed in the horizontal direction, the transmittance in the vertical direction is asymmetrically distributed. Therefore, because an image inversion occurs in the vertical direction, the viewing angle gets narrower.

To solve the problem, the multi-do-main twisted nematic liquid crystals are generally proposed. FIG. 2 is a view showing a structure of two-domain twisted nematic (TDTN) liquid crystal. In FIG. 2, each pixel has two direction configuration domains, where the two pretilted directions are in opposite directions. Applying a gray level voltage to this cell, the liquid crystal directors in two domain are tilted in opposite directions.

FIG. 3 is a view showing a structure of a domain-divided twisted nematic (DDTN) liquid crystal cell. In FIG. 3, the alignment layers 3,4 include two materials having different pretilt angles. The first alignment layer 3 is comprising an organic material, but the second alignment layer 4 is comprising an inorganic material so that direction of an average alignment angle on each alignment layer is in the opposite direction.

The two-domain TN LCD or domain-divided TN-LCD is manufactured by the following steps: rubbing the substrate coated on the alignment layer, inter alia, polyimide; masking some area with a photoresist; rubbing in the opposite direction reversely other area than said masking area; removing the photoresist. Because the process is too complicated as like above, cost is increased.

Generally, the cause of the narrow viewing angle is that the liquid crystal is caused by own character of liquid crystal as being an anisotropic material. Accordingly, a bend-aligned liquid crystal cell has been recently introduced. FIG. 4 is a view showing a structure of a bend-aligned liquid crystal cell, in which a bend-aligned liquid crystal cell 5 and an uniaxial film 6 with optical compensation by eliminating birefringence effect of said liquid crystal cell 5 are placed between two crossed(parallel) polarizer 7. A molecular of the bend-aligned liquid crystal cell 5, as shown in FIG. 4, maintains an acute angle at the surface alignment layer, but the angle becomes larger up to 90 degree at the midlayer between the alignment layers and, it becomes symmetrical structure near the substrate surface so that the viewing angle is improved. The bend-aligned of liquid crystal, having an angle of 90 degree between the molecules of liquid crystal and the alignment layer is formed by rubbing of alignment layer and by injecting liquid crystal maintaining previously decided pretilt angle. Further, if the electric field is applied to said bend-aligned liquid crystal cell, the transmittance is changed owing to the change of an effective refractive index caused by the change of the direction of liquid crystal by applying an electri field.

FIG. 5(a) is a view showing the relationship between the voltage of liquid crystal cell 5 and the transmittance, To is the point where the transmittance is 0, $T_{50}$ is representing the point where the transmittance is 50, and $T_{100}$ is representing the point where the transmittance is 100. FIG. 5(b) is a view showing the relationship between the transmittance and the viewing angle of the horizontal direction. The transmittance being originally 0, 50, and 100 respectively, is more symmetric than that of TNLCD in FIG. 1(b) depending upon the viewing angle. In addition, the transmittance of the vertical direction in FIG. 5(c) is always symmetric at T0, T50, and T100, while the image of the twisted nematic liquid crystal cell is inverted at the horizontal viewing angle of T50. Therefore, the viewing angle of a liquid crystal display using a bend-aligned liquid crystal cell 5 is highly improved in both the horizontal and the vertical direction than the twisted nematic liquid crystal cell.

However, there is still a problem of a particle and an electrostatic discharge on the alignment layer caused by rubbing process because the alignment layer in the bend-aligned liquid crystal cell 5 must be also rubbed before the injection of liquid crystal in order to form pretilt direction in the alignment layer. Particularly, the electrostatic discharge is the most serious problem in terms of the damage on the liquid crystal cell.

SUMMARY OF THE INVENTION

It is an object of the present invention to provide a method for manufacturing the bend-aligned liquid crystal cell in which the viewing angle is improved and it is easy to manufacture by irradiating an ultraviolet ray.

In order to achieve the object, the method for manufacturing the bend-aligned liquid crystal cell of the present invention comprises the steps of setting up the pretilt direction by irradiating a linearly polarized light through the polarizer on the alignment layer of a glass substrate, and injecting the liquid crystal into the gap between said substrates.

DETAILED DESCRIPTION OF THE INVENTION

A conventional photo-alignment layer using the ultraviolet light comprises a polymer of PVCN (polyvinylcinnamate), and is a photopolymerized alignment layer by a crosslinking generating between polymers when a linearly polarized ultraviolet light is irradiated. The alignment direction of the photopolymer is perpendicular to the polarized direction of the linearly polarized ultraviolet light. The pretilt direction of the alignment layer is determined according to the direction of photopolymer. Further, the pretilt direction in said photo alignment layer is changeable according to the irradiation energy or an irradiation direction of the irradiated ultraviolet light. That is, the pretilt direction and angle of the alignment layer depend on a polarized direction and irradiation energy of the ultraviolet light irradiating on the alignment layer.

Figure 6:
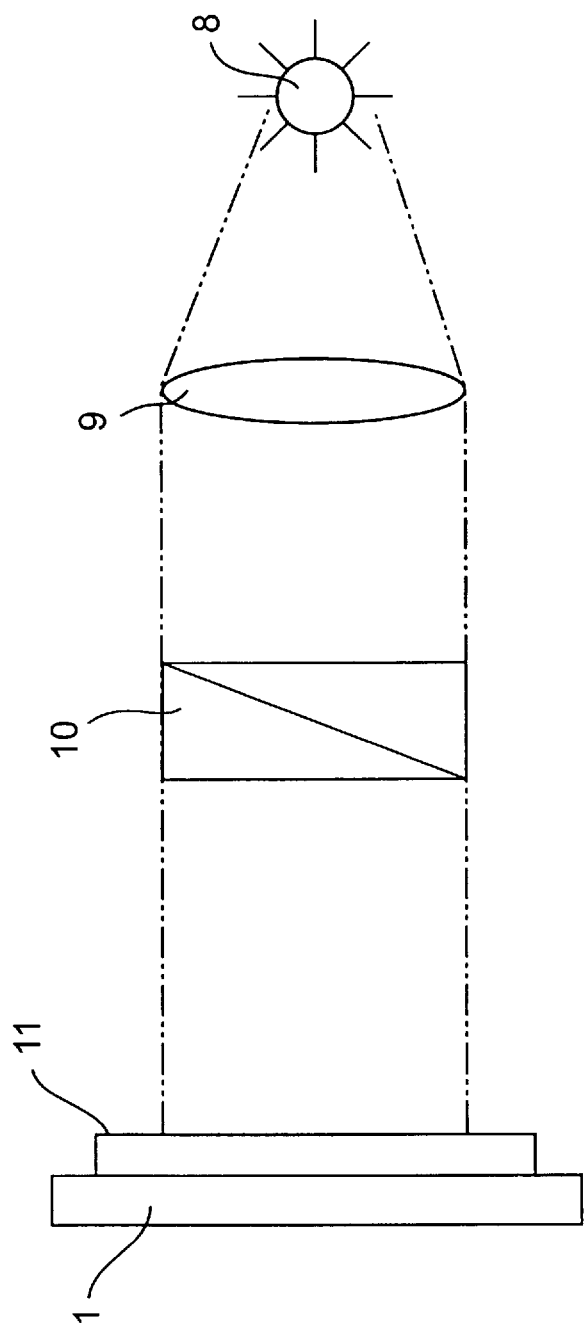
FIG. 6 is a view showing the ultraviolet irradiation device.

FIG. 6 is a drawing showing a device for forming a alignment layer using light according to the present invention. A glass substrate 1 coated with an alignment layer 11 was illuminated with a polarized ultraviolet light beam. The ultraviolet light beam was generated from a lamp 8, and passed through a polarizer 10. The lamp is mainly a mercury lamp, the light from the mercury lamp is linearly polarized after passing through the polarizer 10 so that the linearly polarized light perpendicularly is irradiated to the surface of the alignment layer 11 formed on the glass substrate 1.

Figure 7:
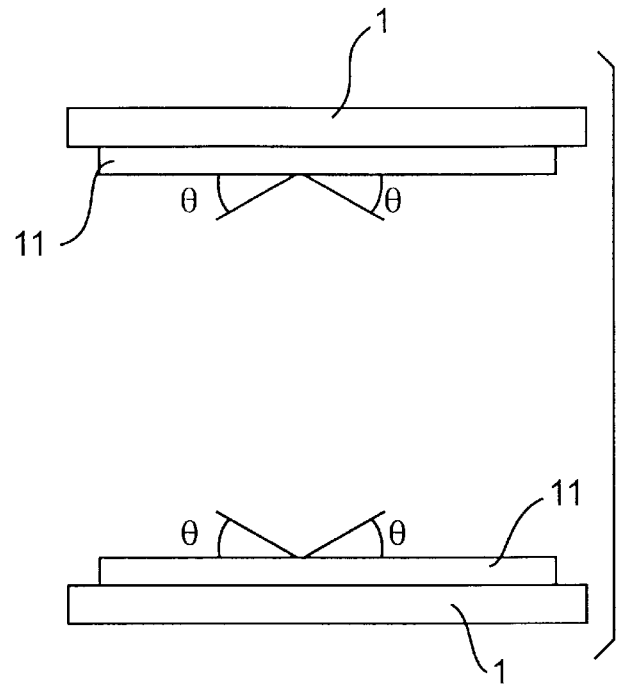
FIG. 7 is a view showing a pretilt angle of a alignment layer formed by irradiating an ultraviolet light.
Figure 8:
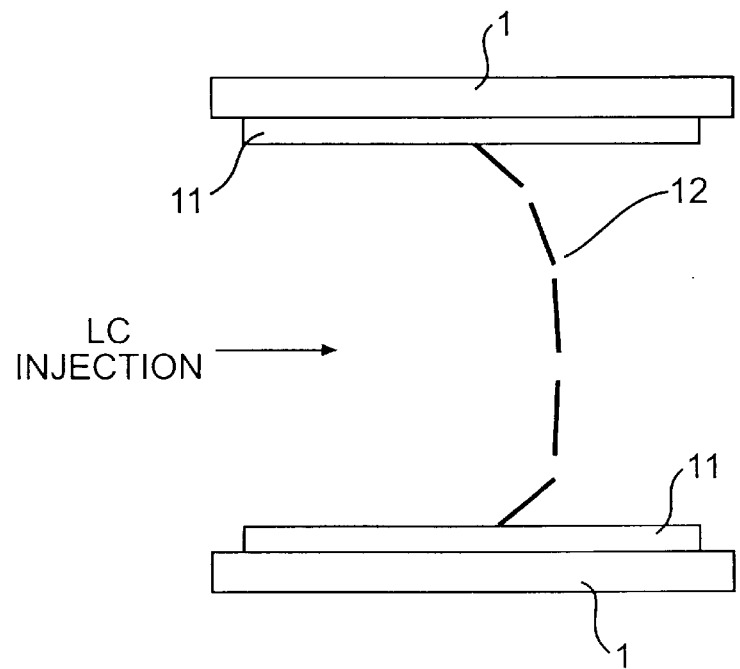
FIG. 8 is a view showing a bend-alogned structure of a liquid crystal formed according to the present invention.

The method for making said LCD is described as follows. First, the alignment layer 11 is formed on the glass substrate; then the ultraviolet light is irradiated said alignment layer using the device shown in FIG. 6. The alignment layer 11 formed on the substrate 1 is made of polysiloxane based material or PVCN-F (polyvinylfluorocinnamate). The pretilt angle formed in said alignment angle is controllable with the intensity of the ultraviolet energy perpendicularly irradiated on the alignment layer, so it is possible to have a pretilt angle larger than 45 degree. Generally, when the ultraviolet light is irradiated to the alignment layer 11 formed on the substrate 1, two pretilt angle($\theta$) directions is formed in same angle as showing FIG. 7. In FIG. 8, one pretilt angle direction is degenerated both two directions so as to be selected the other direction, while the liquid crystal is injecting into the gap formed between substrates.

For example, PVCN-F and polysiloxane cinnamate have following structures:

PVCN—F:

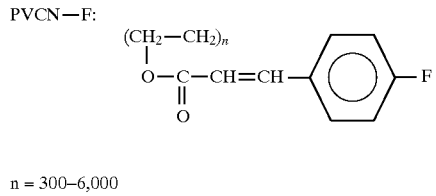

n = 300–6,000 which can be prepared by the reaction of polyvinyl alcohol (here: PVA) and 4-flouro cinnamic acid.

Polysiloxane cinnamate I:

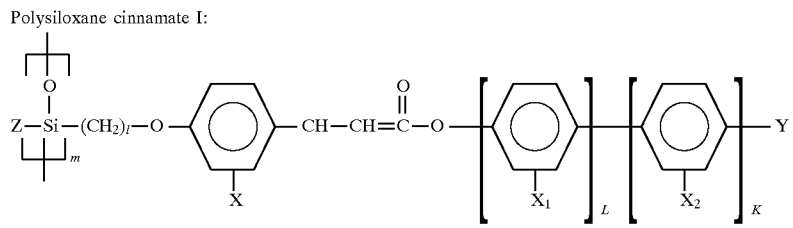

Z can be selected from the group consisting of CH, CH3 or from mixtures thereof, m=10–100, l=1–11, L=0 or 1, K=0 or 1, X, X1, X2, Y=H, F, Cl, CN, CF3, CnH2n+1 or OCnH2n+1 wherein n can be from 1 to 10, or from mixtures thereof;

Polysiloxane cinnamate II:

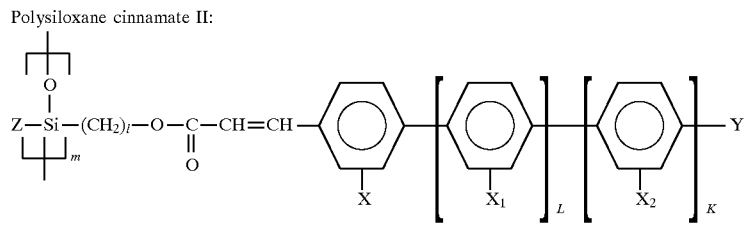

Figure 1A:
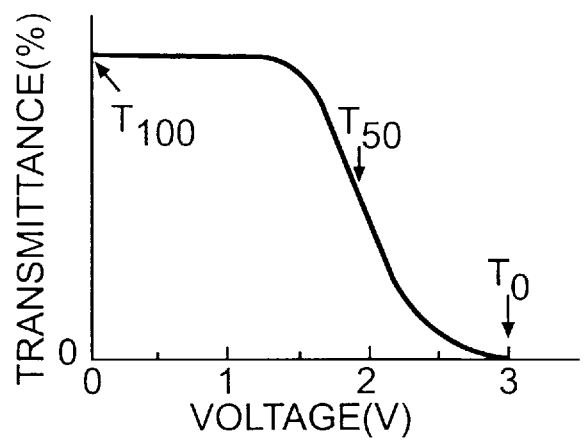
FIG. 1a is a graph showing a relationship between a voltage and a transmittance of the conventional twisted nematic liquid crystal cell.
Figure 1B:
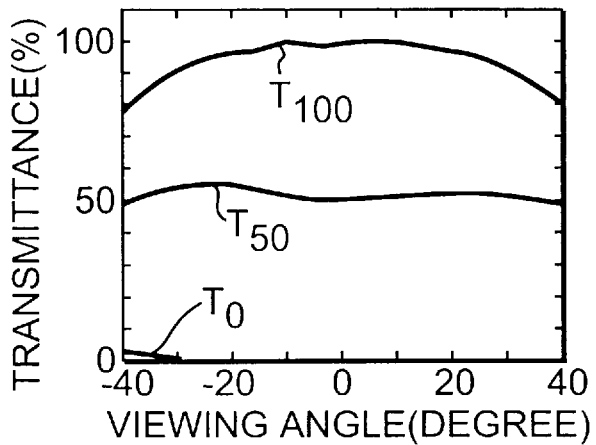
FIG. 1b is a graph showing a transmittance regarding to a horizonal viewing direction of the conventional twisted nematic liquid crystal cell.
Figure 1C:
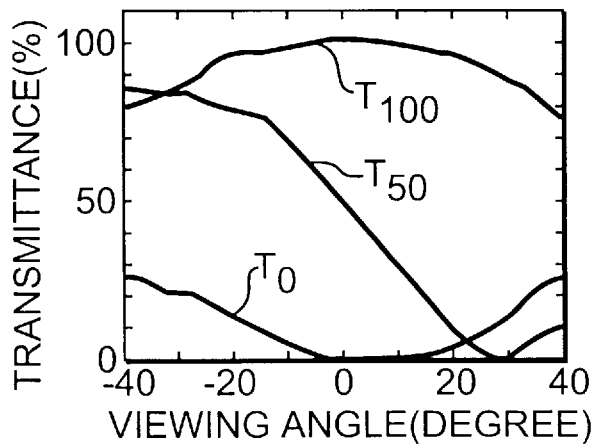
FIG. 1c is a graph showing a transmittance regarding to vertical viewing direction of the conventional twisted nematic liquid crystal cell.
Figure 2:
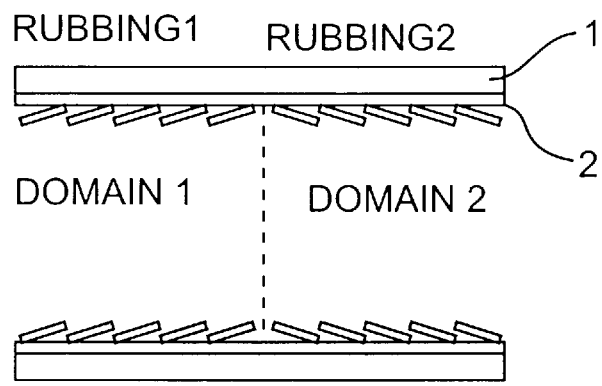
FIG. 2 is a view showing a structure of two-domain twisted nematic liquid crystal cell.
Figure 3:
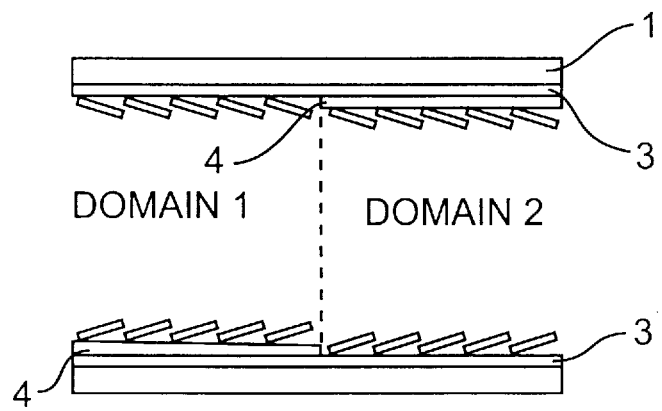
FIG. 3 is a view showing a structure of domain-divided twisted nematic liquid crystal cell.
Figure 4:
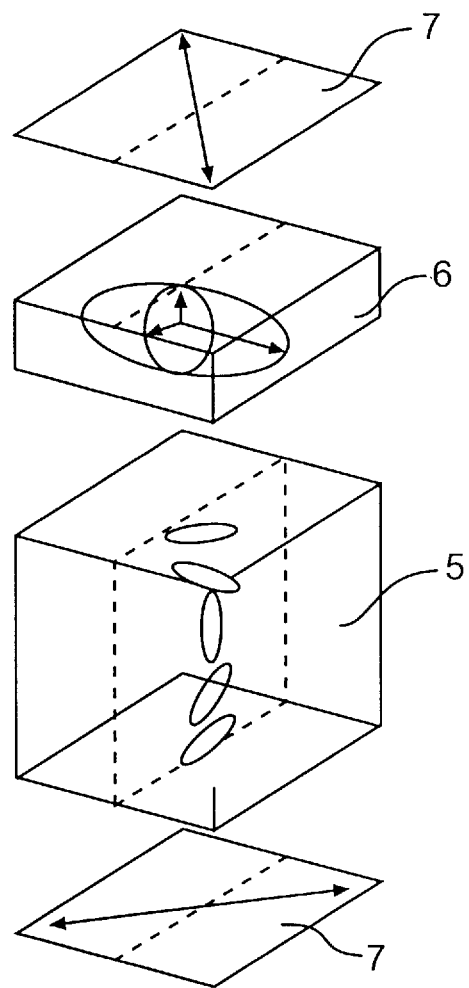
FIG. 4 is a view showing a structure of a conventional bend-aligned liquid crystal cell.
Figure 5A:
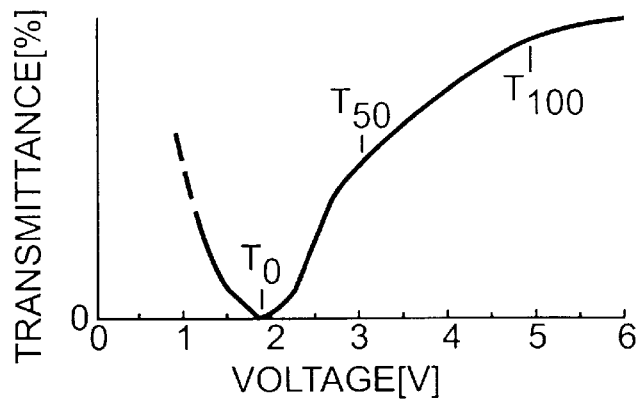
FIG. 5a is a graph showing a relationship between a voltage and a transmittance of the bend-aligned liquid crystal cell.
Figure 5B:
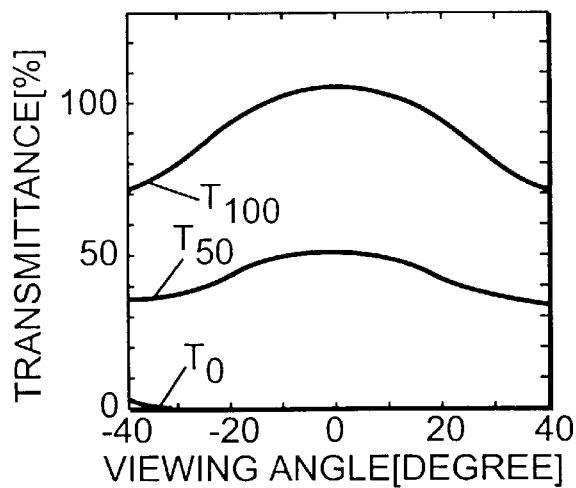
FIG. 5b is a graph showing a transmittance regarding to a horizontal viewing direction of the bend-aligned liquid crystal cell.
Figure 5C:
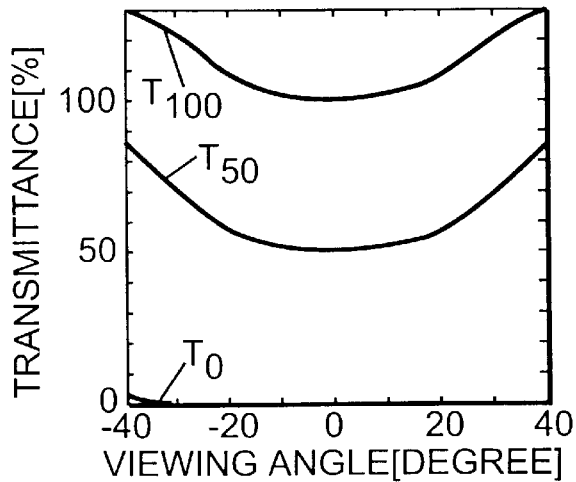
FIG. 5c is a graph showing a transmittance regarding to a vertical viewing direction of the bend-aligned liquid crystal cell.

Z can be selected from the group consisting of OH, CH3 or from mixtures thereof, m=10–100, l=1–11, L=0 or 1, K=0 or 1, X, X1, X2, Y=H, F, Cl, CN, CF3, CnH2n+1 or OCnH2n+1 wherein n can be from 1 to 10, or from mixtures thereof;

Accordingly, the liquid crystal 12 is injected at the left side of the glass substrate 11 which is parallel to the alignment direction of the alignment layer. The pretilt direction set up between[]the alignment layers 11 as shown in FIG. 8 by flowing of liquid crystal, is toward where the liquid crystal is flowing. In Addition, when the pretilt angle of the alignment layer 11 is larger than 45 degree, it is possible to form a bend-aligned without applying the electric field. Therefore, if the liquid crystal is injected after setting up the pretilt angle of the alignment layer 11 larger than 45 degree by controlling the ultraviolet irradiation energy, the molecular of the liquid crystal 12 is symmetrically distributed between upper and lower substrate. It is caused by flowing of the liquid crystal so that the asymmetry phenomena in both vertical and horizontal direction is disappeared. Therefore, the viewing angle is wider than the viewing angle of the conventional twisted nematic liquid crystal cell as shown in FIG. 5.

According to the present invention, a bend-aligned liquid crystal cell is manufactured by irradiating the ultraviolet light on the alignment layer so that the viewing angle becomes wider, the damage to the alignment layer caused by rubbing process can be prevented and the number of processes can be reduced.

It is to be understood that the form of the present invention herein show and described is to be taken as a preferred example of the same and that various applications may be resorted to without departing from the spirit of the present invention or the scope of the subjoined claims.

What is claimed is:

1. A method for manufacturing a bend-aligned liquid crystal cell using light comprising the steps of:

irradiating a first alignment layer with a first polarized ultraviolet light to impart a first pretilt angle in said first alignment layer;

irradiating a second alignment layer with a second polarized ultraviolet light to impart a second pretilt angle in said second alignment layer; and injecting liquid crystal between said first and second alignment layers in a direction parallel to alignment directions of said first and second alignment layers.

2. The method in accordance with claim 1, wherein said alignment direction of said first alignment layer is the same as said alignment direction of said second alignment layer.

3. The method in accordance with claim 1, wherein said first and second alignment layers include polysiloxane based materials.

4. The method in accordance with claim 1, wherein said first and second alignment layers include polyvinylfluorocinnamate.

5. The method in accordance with claim 1, wherein said step of irradiating said first alignment layer includes the step of irradiating said first alignment layer at an angle substantially perpendicular to said first alignment layer; and wherein said step of irradiating said second alignment layer includes the step of irradiating said second alignment layer at an angle substantially perpendicular to said second alignment layer.

6. The method in accordance with claim 1, further comprising the step of:

adjusting said first and second pretilt angles by setting energies of said first and second polarized ultraviolet lights, respectively.

7. The method in accordance with claim 1, wherein said first polarized ultraviolet light includes linearly polarized light.

8. The method in accordance with claim 1, wherein said steps of irradiating said first and second alignment layers include the step of adjusting energies of said first and second polarized ultraviolet lights to impart first and second pretilt angles greater than 45 degrees.

9. A method for manufacturing a bend-aligned liquid crystal cell using light comprising the steps of:

irradiating a first alignment layer with a first polarized light to impart a plurality of pretilt directions in said first alignment layer;

irradiating a second alignment layer with a second polarized light to impart a plurality of pretilt directions in said second alignment layer; and injecting liquid crystal between said first and second alignment layers in a direction to select one of said pretilt directions.

10. The method in accordance with claim 9, wherein said step of injecting liquid crystal between said first and second alignment layers determines alignment directions of said first and second alignment layers.

* * * * *